United States Patent
Kawa et al.

(10) Patent No.: US 9,817,059 B2
(45) Date of Patent: Nov. 14, 2017

(54) EVALUATION OF THERMAL INSTABILITY STRESS TESTING

(71) Applicant: Synopsys, Inc., Mountain View, CA (US)

(72) Inventors: Jamil Kawa, Campbell, CA (US); Thu Nguyen, Palo Alto, CA (US); Tzong-Kwang Henry Yeh, Los Gatos, CA (US); Shih-Yao Christine Sun, San Jose, CA (US); Raymond Tak-Hoi Leung, Palo Alto, CA (US)

(73) Assignee: SYNOPSYS, INC., Mountain View, CA (US)

( * ) Notice: Subject to any disclaimer, the term of this patent is extended or adjusted under 35 U.S.C. 154(b) by 206 days.

(21) Appl. No.: 14/748,228

(22) Filed: Jun. 23, 2015

(65) Prior Publication Data
US 2015/0369855 A1    Dec. 24, 2015

Related U.S. Application Data

(60) Provisional application No. 62/016,588, filed on Jun. 24, 2014.

(51) Int. Cl.
  *G01R 31/02* (2006.01)
  *G01R 31/26* (2014.01)
  *G06F 17/50* (2006.01)
(52) U.S. Cl.
  CPC ..... *G01R 31/2628* (2013.01); *G06F 17/5081* (2013.01)
(58) Field of Classification Search
  CPC .......................... G06F 17/5081; G01R 31/2628

USPC ..................................................... 324/762.09
See application file for complete search history.

(56) References Cited

U.S. PATENT DOCUMENTS

| | | | | |
|---|---|---|---|---|
| 2005/0212543 A1* | 9/2005 | Suzuki | ............... | G01R 31/2856 324/750.3 |
| 2005/0278677 A1* | 12/2005 | Ang | ................... | G01R 31/2628 438/18 |
| 2006/0049842 A1* | 3/2006 | Krishnan | ........... | G01R 31/2621 324/762.09 |
| 2006/0076972 A1* | 4/2006 | Walker | ............... | G01R 31/2642 324/762.09 |
| 2006/0267621 A1* | 11/2006 | Harris | ................ | G01R 31/2884 324/762.02 |
| 2010/0038683 A1* | 2/2010 | Shanware | ............ | H01L 27/092 257/204 |
| 2013/0015876 A1* | 1/2013 | Lai | ..................... | G01R 31/2642 324/762.01 |

* cited by examiner

*Primary Examiner* — Patrick Assouad
*Assistant Examiner* — Demetrius Pretlow
(74) *Attorney, Agent, or Firm* — HIPLegal LLP; Judith Szepesi

(57) ABSTRACT

A circuit is powered through a transistor whose thermal instability behavior is to be evaluated in a stress test. The transistor is stressed during a stress phase of the stress test with a sensor circuit powered off and the Vds of the transistor is zero. The sensor circuit is powered on through the transistor during an evaluate phase of the stress test.

24 Claims, 12 Drawing Sheets

EVALUATION OF THERMAL INSTABILITY STRESS TESTING

RELATED APPLICATION

The present invention claims priority to U.S. Provisional Application No. 62/016,588 filed on Jun. 24, 2014, which is incorporated herein in its entirety.

FIELD

The present invention relates generally to Negative Bias Thermal Instability (NBTI) evaluation of CMOS transistors and circuits.

BACKGROUND

A transistor is a semiconductor device used to amplify and switch electronic signals and electrical power. It is composed of semiconductor material with at least three terminals for connection to an external circuit. The terminals are a gate, a source, a drain, and a body. Voltage is transmitted from the source to the drain when the transistor is on, which is controlled via a voltage applied to the gate. A complimentary metal-oxide-semiconductor (CMOS) is a technology to make circuits including semiconductor transistors.

Two associated parameters of both P-type and N-type CMOS semiconductor transistors are threshold voltage, the voltage needed between the gate of a transistor and its source to turn it on, and saturation current, the current flowing through the source of a CMOS device with the gate voltage at maximum drive with respect to the source (VDD) and the voltage applied across the drain and source equal to VDD. Both parameters indicate the drive strength of the CMOS transistor. These two transistor parameters, the threshold voltage and the saturation current, are reflected in the speed of circuits in which such transistors are used as basic components.

CMOS transistors, P-type and N-type undergo a change, typically a degradation, in their threshold voltage and saturation current over time. This degradation in the threshold voltage and saturation current of a transistor takes the form of an increase in the magnitude of the threshold voltage and a decrease in the magnitude of the saturation current. There are several physics based phenomena that cause such degradation.

One phenomenon is elevated electric fields between the gate of the transistor and its drain, known as hot carrier injection (HCI) resulting in a permanent shift in threshold voltage. Another phenomenon is "biased thermal instability" (BTI) that causes partially recoverable degradation in the threshold voltage of the transistor.

BTI is highly dependent on several factors, including temperature, total switching time, and the switching behavior of the transistor, also known as the switching duty cycle. The BTI induced change in the threshold voltage and saturation current of P-type transistors (P-transistor) referred to as "negative bias thermal instability" (NBTI). This is an issue in P-type transistors because they almost always operate with negative gate-to-source voltage. It is also an issue in N-type transistors when a negative bias is applied to the gate.

The NBTI phenomenon is a partially reversible process. This means that when the applied source-to-gate bias is removed, the transistor is capable of recovering part of the change in threshold voltage and in saturation current brought about by the applied bias. The amount of recovery is heavily dependent on the duration of the absence of any source-to-gate bias.

Modeling NBTI is important for accurate circuit simulation. Because of the partial recovery aspect of NBTI, the accuracy of modeling depends on the amount of time between the application of the source-to-gate bias and the measurement of the magnitude of change in the threshold voltage and saturation current.

FIG. 1 illustrates a standard NBTI test setup representing the current state of the art. A bench tester 10 applies an external voltage bias of zero volts to the gate of a P-transistor P10 and measures the current flowing through the transistor. Then the P-transistor P10 is stressed through applying a stress voltage Vg at the gate of the P-transistor P10 and through applying a voltage Vdd, equal to the source voltage of P-transistor P10, the drain of the P-transistor P10 to keep the potential between the source and the drain of P-transistor P10 at zero during the stress phase of the test as shown in waveform 20. After the stress phase is complete, the bench tester 10 releases the applied voltages to the gate and drain of P-transistor P10 and re-applies a bias of zero volts to the gate of the P-transistor P10. The bench tester 10 then measures the new value of the current flowing through the transistor. There is usually a delay between the stress phase and the measure phase determined by the tester limitations and specifications.

BRIEF DESCRIPTION OF THE FIGURES

The present invention is illustrated by way of example, and not by way of limitation, in the figures of the accompanying drawings. The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DETAILED DESCRIPTION

Figure 1:
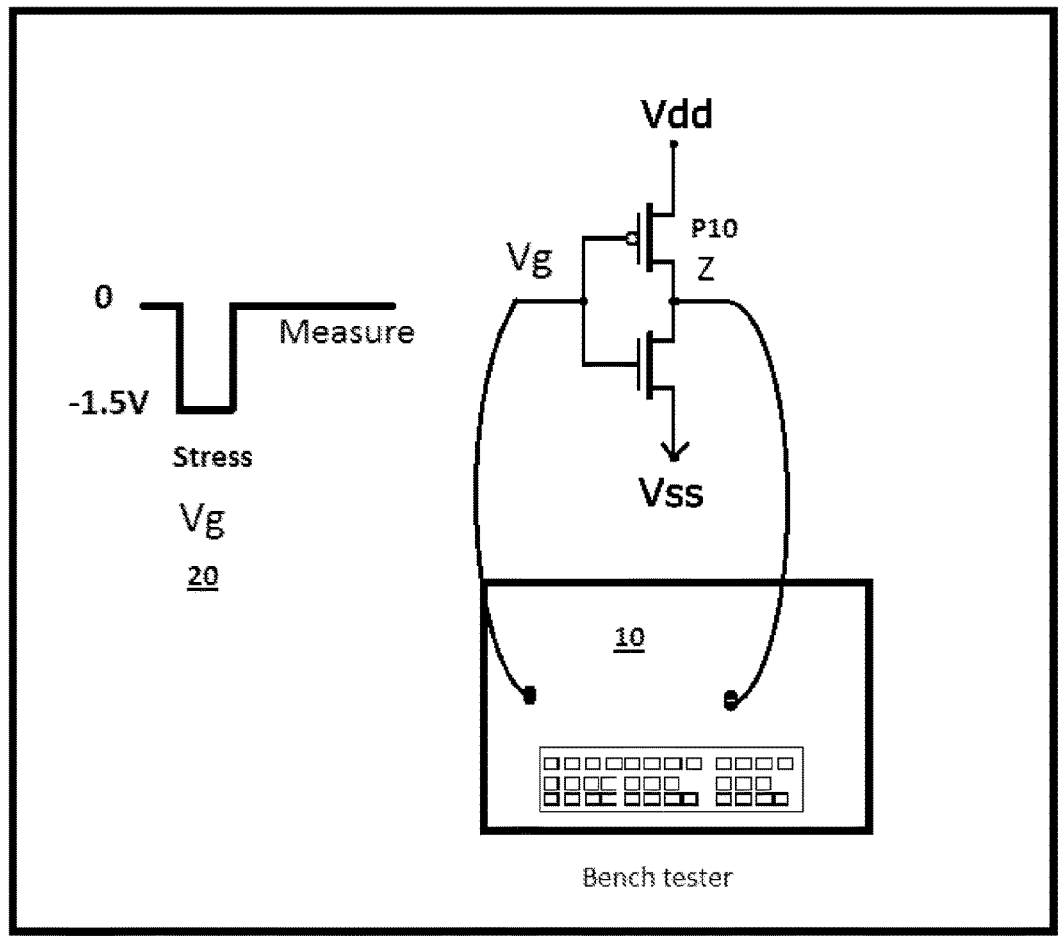
FIG. 1 is a diagram of a classical setup (prior art) for measuring NBTI using a bench tester set-up.

The objective of this invention is to accurately determine the change in a CMOS transistor threshold voltage and saturation current resulting from BTI, bias temperature instability. BTI encompasses NBTI (negative bias temperature instability and PBTI (positive bias temperature instability). In one embodiment, the system includes a circuit comprising a transistor under evaluation, the transistor having a gate-to source voltage Vgs and a drain-to-source voltage Vds. In one embodiment, the system also includes a sensor circuit connected to the drain of the transistor and a complementary control circuitry coupled to the transistor and the sensor circuit, such that the sensor circuit is powered off during a stress test of the transistor, and the voltage between the source and drain of the transistor (Vds) is zero during the stress test. In one embodiment, the sensor circuit is a ring oscillator. The complementary control circuitry is further to ensure that the sensor circuit is powered through the transistor during an evaluation of the stress test.

In one embodiment, the circuit includes a sensor circuit driven by a transistor under evaluation. In one embodiment, the circuit may include additional circuit elements ensuring the proper conduction of the stress and evaluation phases of the stress test. In one embodiment, the circuit has three components:

1) The transistor to be stressed and then evaluated. In one embodiment, the transistor is a P-MOS transistor.
2) A sensor circuit that is driven directly or indirectly by the P transistor under evaluation and that is powered during the evaluation phase only.
3) Control logic that ensures that during the stress phase the voltage across the source and drain of the transistor is zero, or small enough, to make sure that no Hot Carrier Injection (HCI) component of degradation takes place interfering with the objective of evaluating NBTI; and that the sensor circuit is powered down to make sure the transistors of the sensor circuit themselves do not undergo degradation;
   a) in one embodiment, the Control Logic further ensures that during the stress phase the voltage across the source and drain of the transistor is zero, or small enough, to make sure that no Hot Carrier Injection (HCI) component of degradation takes place,
   b) in another embodiment, the Control Logic sets the bias to across the transistor to enable measurement of BTI and HCI.

The present invention concerns a test circuit for evaluating the Negative Bias Thermal Instability (BTI) of a CMOS transistor. In one embodiment, the transistor is a P-type transistor, and the system evaluates the effect of NBTI. The below example focuses on P-type transistor testing, but one of skill in the art would understand that similar processes may be used to evaluate the effect of PBTI, on N-type transistors. The circuits and methods described provide flexible and accurate measurement of threshold voltage and of saturation current degradation caused by NBTI. In one embodiment, a sequence of stressing the P-transistor by applying a stress voltage to the gate of the transistor with respect to its source while maintaining a zero potential between the source and drain of the P-transistor under stress ensures that NBTI is the only physical phenomena undergone by the transistor. The test circuit is set up so that the ring oscillator is not powered during stress to ensure that the transistors of the oscillator do not undergo stress and degradation during the stress test and are preserved for accurate evaluation.

The control circuit controls the supply of power through the P-transistor to the ring oscillator simultaneously with the removal of the stress from the gate of the P-transistor being evaluated. A frequency of the oscillator is then captured through a tester or a counter. The method of registering the frequency of the ring oscillator may be any of the techniques known in the art.

Figure 2:
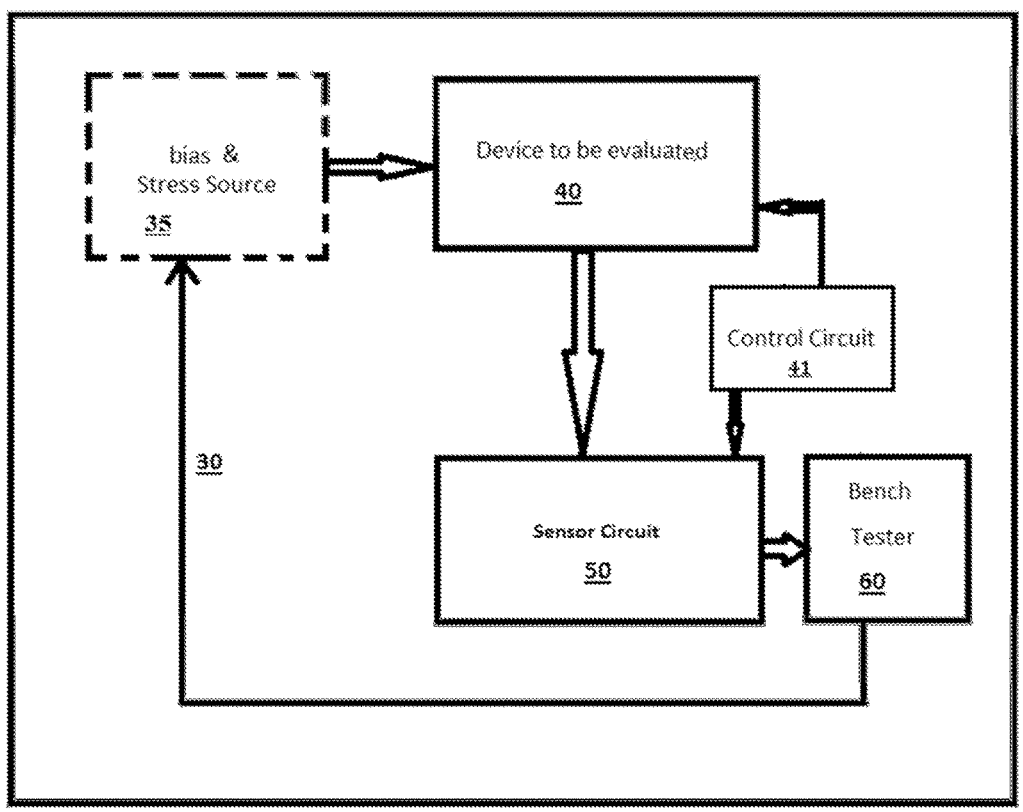
FIG. 2 is a block diagram of one embodiment of a circuit for fast and accurate thermal instability stress testing and evaluation.

FIG. 2 is a block diagram of one embodiment of a system for performing the fast and accurate evaluation of BTI. Control signals 30 from the bench tester 60 are applied to the P-transistor to be evaluated as a fresh device, then to be stressed, then to be evaluated after stress. In one embodiment, bias & stress source 35 is a subset of the bench tester 60. P-transistor device 40 is the P-transistor to be stressed and evaluated. Complementary control circuitry 41 is the control circuitry ensuring the proper bias and control conditions for the P-transistor under evaluation and that sensor circuit 50 is driven through the P-transistor device 40. The sensor circuit 50 is powered through the P-transistor device 40 under evaluation and controlled by the complementary control circuitry in 41 to ensure no power is delivered from the P-transistor device 40 to the sensor circuit 50 during the stress phase of the test. Tester 60 provides supply voltages to both the biased nodes of the P-transistor device 40 and complimentary control circuits 41. In one embodiment, sensor circuit 50 is a ring oscillator and is used to read the voltage output of the P-transistor device 40 as the oscillator frequency or the count of a counter included in the circuitry of sensor circuit 50.

Figure 3:
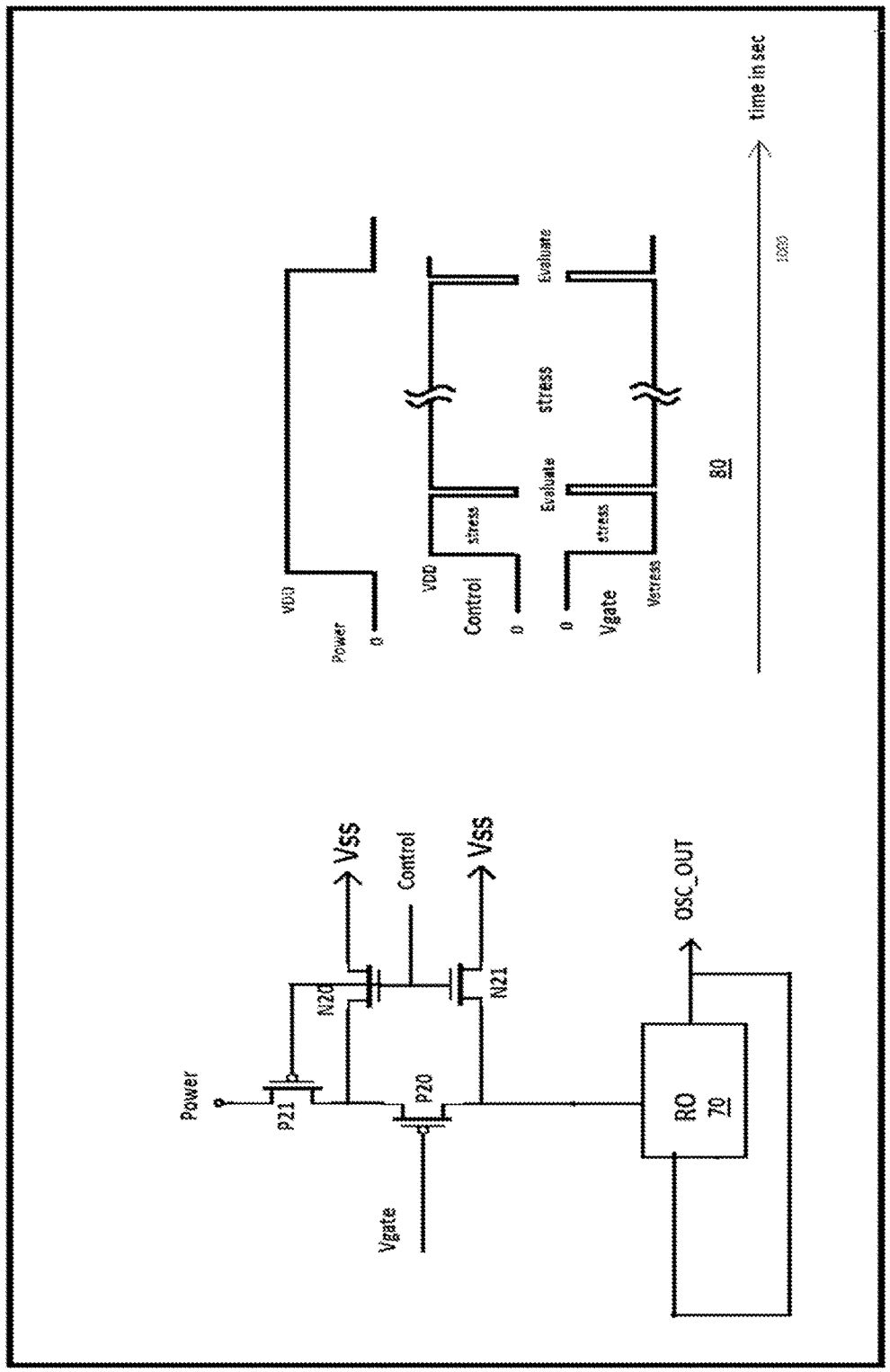
FIG. 3 is a circuit diagram of one embodiment of the test circuit.

FIG. 3 shows one embodiment of circuit diagram and associated signals. The Control signal ensures no power delivery to the ring oscillator 70 during a stress phase of a test sequence. The Control signal in one embodiment ensures a zero volt bias between the source and drain of the P-transistor under evaluation P20 during the stress phase through control transistors N20 and N21. In another embodiment, the Control Signal biases the source and/or drain are the device under stress for a specific Vds to combine BTI and HCI. In one embodiment, this is done by replacing Vss at the drains of N20 and N21 with Vbias1 and Vbias2.

The Control signal also ensures the delivery of power to the ring oscillator 70 during an evaluation phase of the test sequence through a power gating transistor P21 and the P-transistor under evaluation P20. A Vgate signal is the gate voltage applied the gate of the P-transistor under evaluation P20. The Vgate signal is shown in timing diagram 80. The timing diagram 80 represents one embodiment of the sequence of events of the signals Power, Control, and Vgate to ensure pre- and post-stress evaluation of the P-transistor under evaluation P20 and of a no stress to ring oscillator 70 during the stress phase.

The timing diagram 80 shows the values of the control and Vgate signals, during the stress test.

Figure 4:
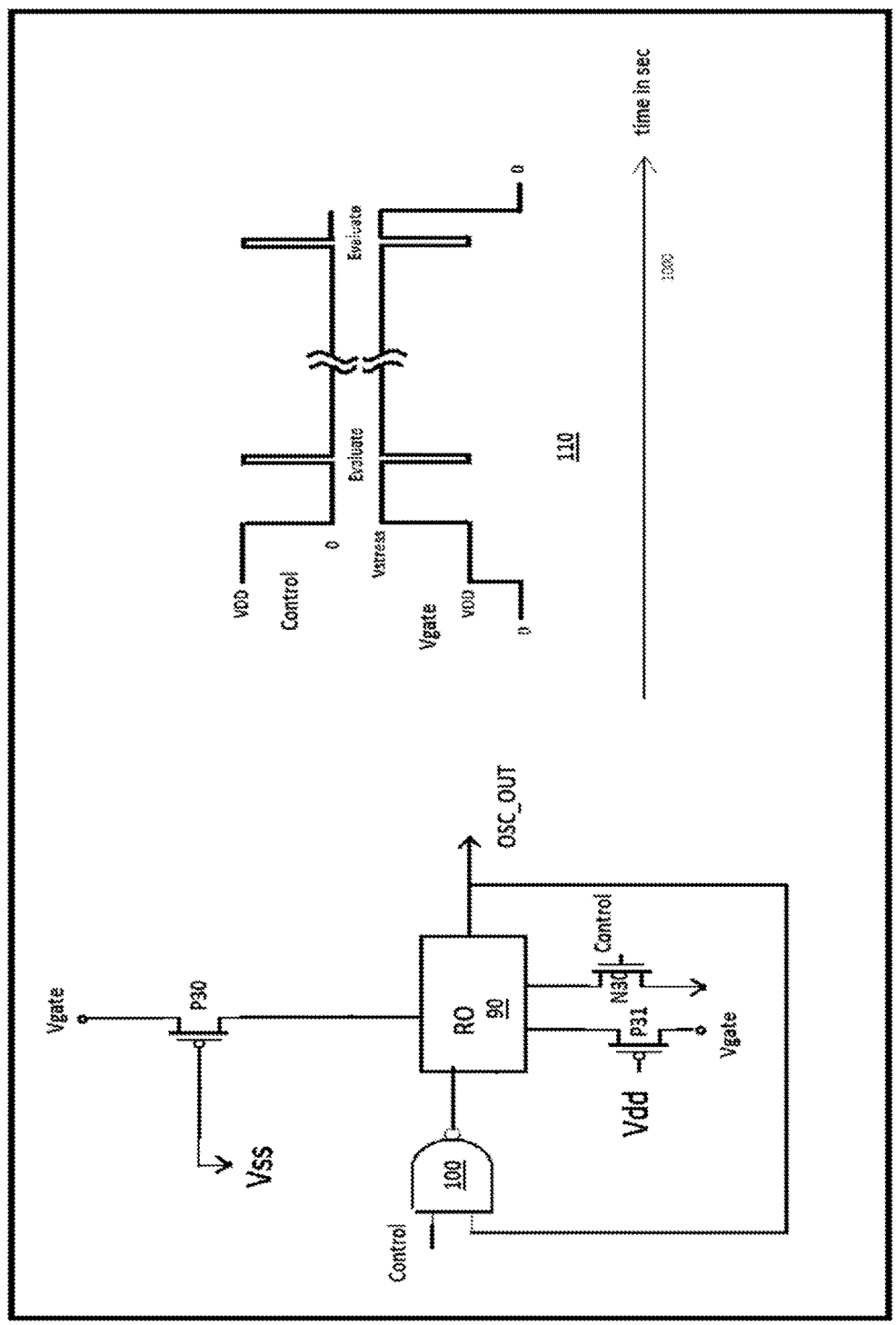
FIG. 4 is a circuit diagram of another embodiment of the test circuit.

FIG. 4 is another embodiment of a circuit diagram and associated signals. A Control signal in conjunction with a Vgate signal ensures normal power delivery to a ring oscillator 90 during the evaluate phase of the test sequence through transistors P31 and N30. The Control signal also ensures, in conjunction with the signal Vgate, a zero Voltage bias across the ring oscillator 90 during a stress phase of the stress test. The Vgate signal is the source voltage of a P-transistor P30 under test and of the associated circuitry transistor P31.

Vgate is shown in timing diagram 110. The timing diagram 110 represents an embodiment of the sequence of events of the signals Control and Vgate to ensure pre- and post-stress evaluation of the P-transistor P30 and of a no stress of ring oscillator 90 during the stress phase of the P-transistor P30.

Figure 5:
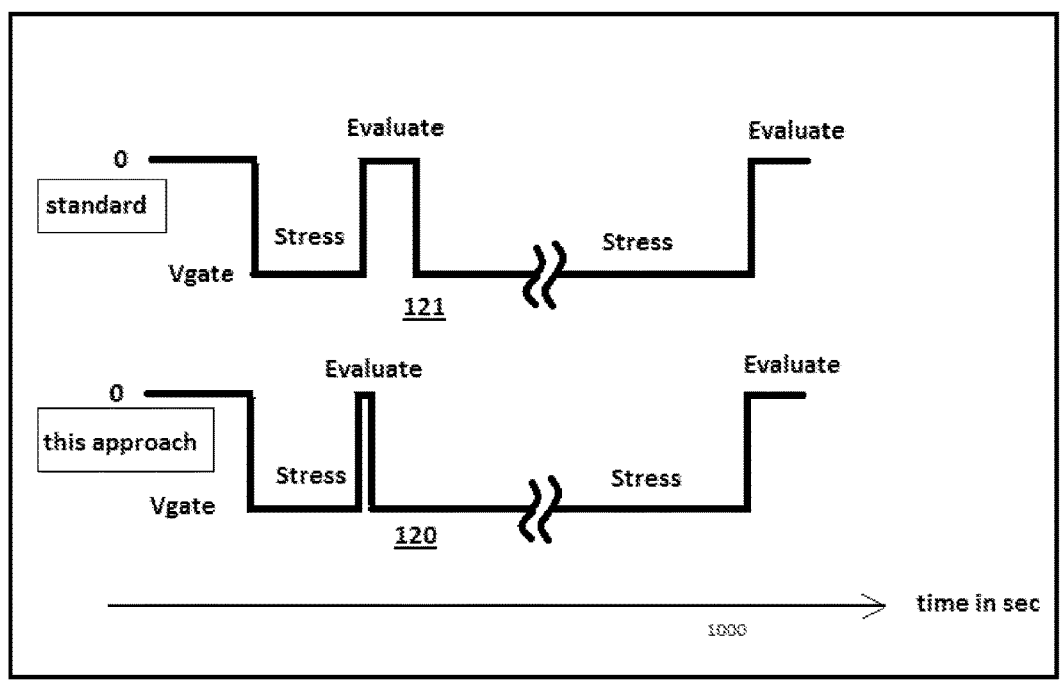
FIG. 5 is a timing diagram, showing one embodiment of prior-art test timing and a test timing using the fast thermal instability circuit of the present invention.

Referring now to FIG. 5, a comparison of the timing of the stress and evaluation cycles is shown between a standard methodology and a methodology in accordance with one embodiment of the present invention.

A standard type of stress and evaluate cycle is shown in timing diagram 121. An exemplary stress and evaluate cycle using the present invention is shown in timing diagram 120. The timing diagram depicts alternating stress and evaluate cycles, where a P-transistor gate voltage assumes one of the values of zero, typical of normal operation of the P-transistor during the evaluate phase, and the value of Vgate, which is lower than 0 during the stress phase of the stress/evaluate cycles for approach timing diagram 120 and prior art timing diagram 121. In one embodiment, for NBTI testing, the typical value of Vgate is in the range of −0.8V to −1.5V, depending on the silicon process size of the design, and a typical cumulative stress time is 1000 seconds with the stress/evaluate procedure typically conducted at a temperature of 125 degrees C. Approach timing diagram 120 depicts a significantly shorter time for the evaluate cycle under the present invention than under the existing state of the art procedure prior art timing diagram 121. Because the transistor suffering from BTI can undergo a partial recovery during the evaluate cycle, a shorter evaluate cycle approach timing diagram 120 translates to more accurate measurement, and shortens the time to reach 1000 seconds (or another timeframe) of cumulative stress time.

Figure 6:
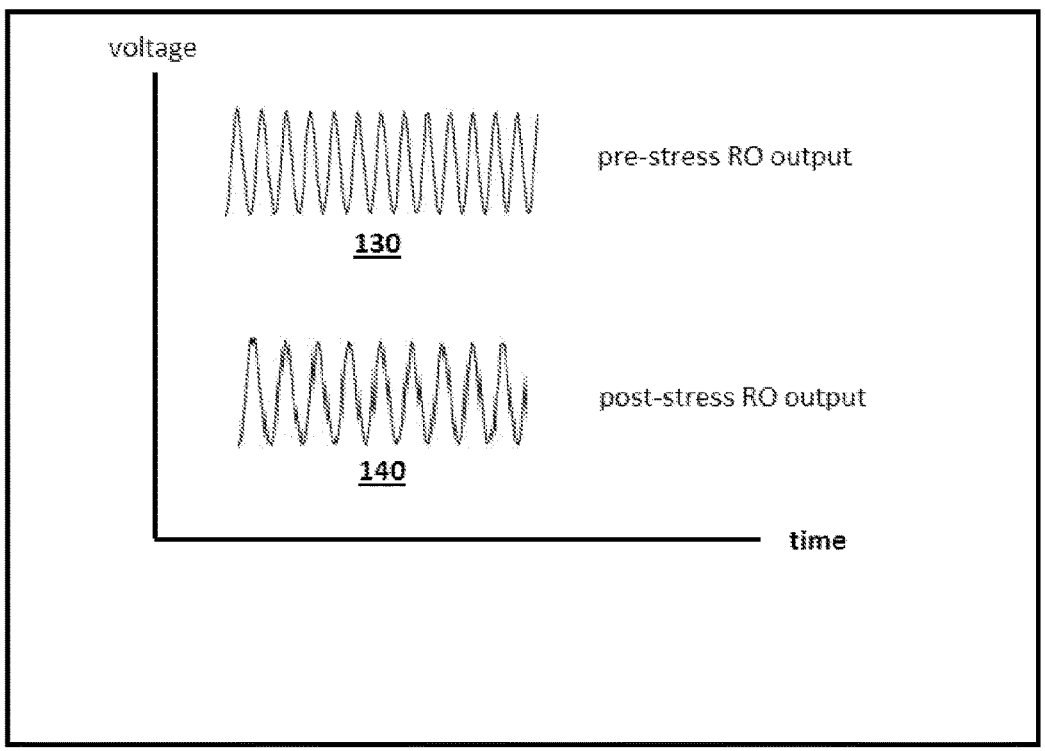
FIG. 6 is an exemplary output of a ring oscillator, showing the before stress and after stress test results.

Referring now to FIG. 6, a sample pre-stress oscillator output and a sample post-stress oscillator output in accordance with one embodiment of the present invention are shown. A sample pre-stress output 130 has a frequency proportional to a drive strength of a P-transistor under evaluation, which in turn is reflective of that P-transistor threshold voltage and saturation current. This sample pre-stress oscillator output can be compared to a sample post-stress oscillator output 140, which has a frequency proportional to the drive strength of the P-transistor under evaluation after that P-transistor has undergone stress, which is reflective of that P-transistor threshold voltage and saturation current after stress. The ratio of the two frequencies of the oscillator, output 130 and 140 is an indication of the amount of degradation the P-transistor has undergone.

Figure 7:
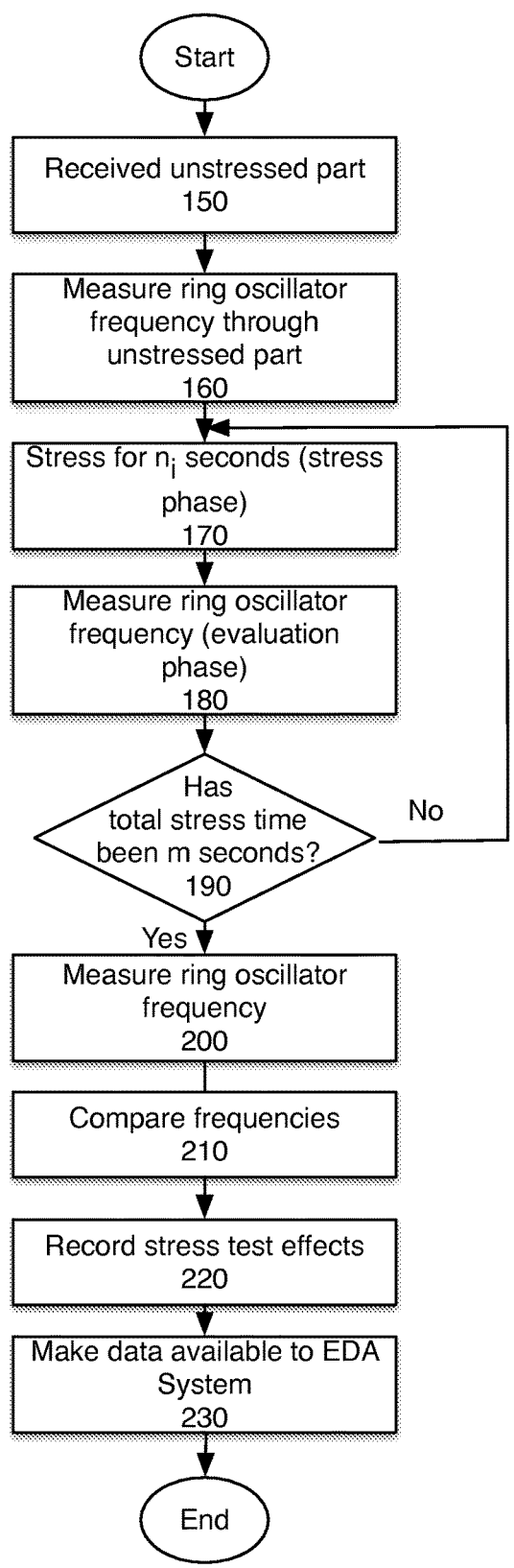
FIG. 7 is a flowchart of one embodiment of the testing cycle.

Referring now to FIG. 7, a representative flowchart of one embodiment of a stress/evaluate procedure is shown. In accordance with this flow, a procedure is initiated with a fresh unstressed P-transistor (block 150). With the fresh P-transistor in normal operating mode, representative of an initial evaluate phase, a ring oscillator output is measured and recorded (block 160). Then the P-transistor is subjected to stress for a first specified number of seconds ($n_i$) with the gate of the P-transistor at Vgate representing a stress cycle of a stress and evaluation cycle (block 170). After the stress test phase is complete, an evaluate phase is entered, where the output frequency of the ring oscillator is measured and recorded (block 180).

If the cumulative number of seconds from the cycles of block 170 is less than the desired cumulative total stress time (m), then another evaluation cycle is entered, by returning the process to the stress phase (block 170) lasting for a specified number of seconds. The length ($n_i$) of the individual stress tests (at block 170) may differ. In one embodiment, the lengths get sequentially longer. In one embodiment, the cumulative number of seconds (m) from the stress periods of block 170 totals a desired cumulative total stress time of 1000 seconds. In another embodiment, the cumulative number of seconds from the cycles of block 170 totals a desired cumulative total stress time of 500 seconds. If the cumulative number of seconds from the cycles of block 170 is greater than or equal to the desired cumulative total in block 190, then a final evaluation cycle for a final measurement and recording of the post-stress frequency of the ring oscillator is made in (block 200).

It is clear to the reader that FIG. 7 is only one embodiment of a stress/evaluate flow for NBTI evaluation of a P-transistor. Steps 150 through 200 can be repeated for any desirable numbers of seconds in block 170 or with any desired cumulative total stress time with intermediate measurements of post stress frequencies of the ring oscillator in block 200. There may be a single stress test for m seconds, in one embodiment.

The ring oscillator frequency in block 200, after the stress test, is then compared to the ring oscillator frequency in block 160, prior to the stress test to calculate a degradation of the P-transistor (block 210).

The effects of the stress test are recorded (block 220). The effects may be recorded as a relationship of the length of the stress phase versus the amount of degradation recorded. In one embodiment, the effects may be stored in a table or database. These effects are then made available to an Electronic Design Automation (EDA) tool (block 230), which can use the more detailed BTI data in design.

Figure 8:
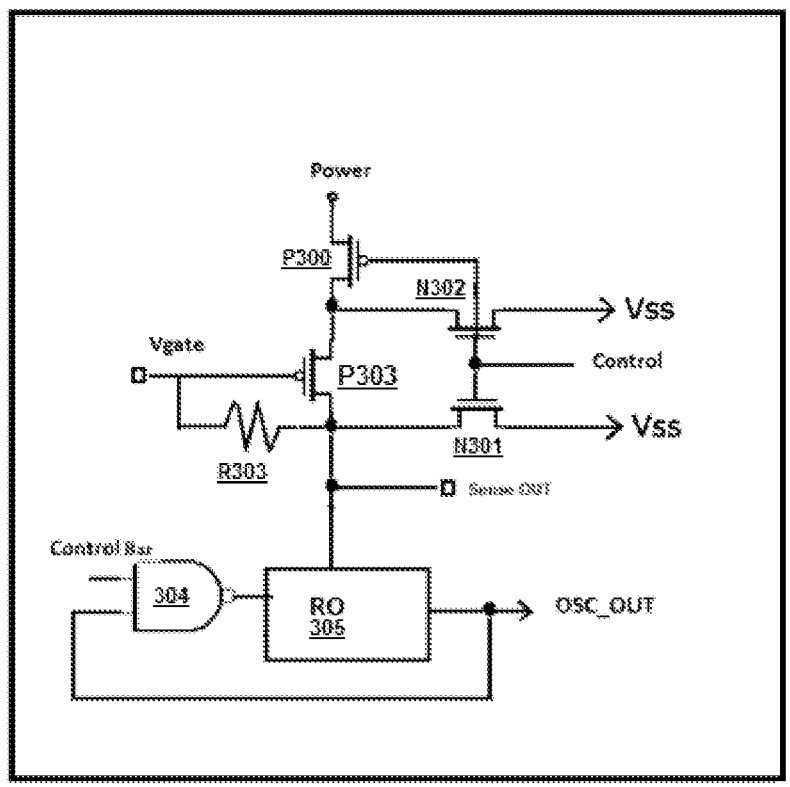
FIG. 8 is a circuit diagram of one embodiment of the test circuit that isolates the increase in magnitude of the threshold voltage aspect of BTI.

FIG. 8 is one embodiment of circuit diagram and associated signals that provide the ability to isolate the increase in the magnitude of the threshold voltage (Vt-shift) as well as characterize the total NBTI effect. A Control signal ensures that the ring oscillator 305 is not powered during a stress phase of a stress test.

The Control signal, in one embodiment, ensures a zero Voltage bias between the source and drain of a P-transistor under evaluation P303 during the stress phase. In one embodiment, this is done through control transistors N301 and N302. The Control signal also ensures the delivery of power to a ring oscillator 305 during an evaluation phase of the test sequence through power gating transistor P300 and the P-transistor under evaluation P303. A Vgate signal is the gate voltage applied the gate of the P-transistor under evaluation P303.

In one embodiment, this is similar to the timing diagram 80 in FIG. 3. The timing diagram 80 of FIG. 3 represents an embodiment of the sequence of events of the signals Power, Control, and Vgate to ensure pre- and post-stress evaluation of the P-transistor under evaluation 303 and no stress of ring oscillator 305 during the stress phase of the P-transistor under evaluation P303.

Returning to FIG. 8, the drain of the P-transistor under evaluation P303 is coupled to the gate of P-transistor under evaluation P303 through a resistor R303. The resistor R303 acts as a current limiter, and limits undesired current flow through the parasitic body diode of the N-type control transistor N301 to Vgate during the stress phase. This enables the pulling down of Vgate below zero, without the clamping that would otherwise result.

An output node Sense OUT is thereby clamped at a value equivalent to Power-Vtp of the P-transistor under evaluation P303, where Vtp represents the threshold voltage of P-transistor under evaluation P303. Thus Vtp is directly measured at Sense OUT. In one embodiment, what is passed to the sensor circuit is not just the degraded mobility and Vt of the device under stress but a VDD-Vt, by clamping gate to drain. So if the Vt deteriorates, the VDD delivered to the sensor block is lower, exaggerating the lower frequency of oscillation of the sensor circuit.

The system also uses the ring oscillator 305 to measure the degradation as a result of NBTI of the P-transistor under evaluation P303. Since the NBTI is a combination of the effect of the threshold voltage degradation and the saturation current degradation, this enables the system to separately quantify both transistor parameters.

Figure 9:
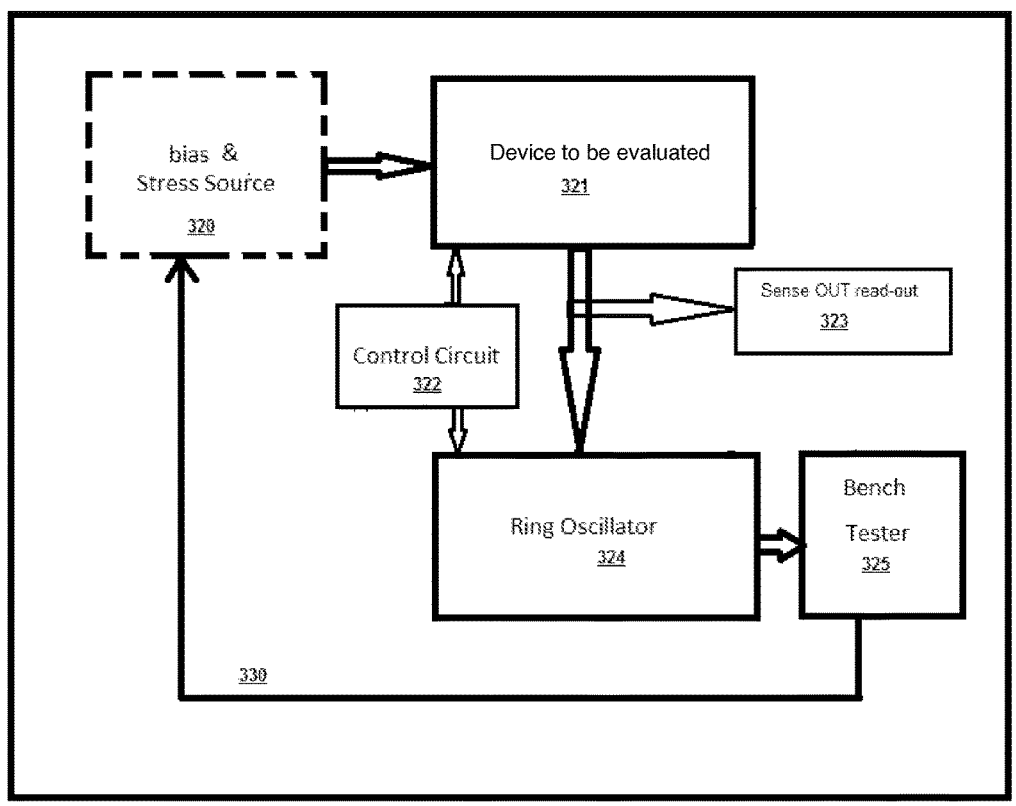
FIG. 9 is a block diagram of the embodiment of a circuit for fast and accurate thermal instability stress testing and evaluation presented in FIG. 8

Referring now to FIG. 9, a block diagram describing one embodiment of a system for performing the fast and accurate evaluation of NBTI, including the ability to isolate the Vt-shift part of NBTI. Control signals 330 from a bench tester 325 are applied to a P-transistor to be evaluated as a fresh device, then to be stressed, then to be evaluated after stress 321. In one embodiment, bias & stress source 320 is a subset of the bench tester 325. P-transistor 321 is the P-transistor to be stressed and evaluated.

Complementary control circuitry 322 is the control circuitry ensuring the proper bias and control conditions for the P-transistor 321 under evaluation, and ring oscillator circuit 324 driven through the P-transistor. Sensor node 323 directly senses the drain of the P-transistor 321 under evaluation and is controlled by the complementary control circuitry in 322 to ensure that no power is delivered from the P-transistor 321 to the ring oscillator circuit 324 during a stress phase, and to ensure no current surge from the complementary control circuitry 322 flows to the bias and stress source 320. Bench tester 325 provides supply voltages to both the biased nodes of the P-transistor 321 and complimentary control circuitry 322, and sensor node 323 is used to read out the oscillator frequency or the count of any counter included in the circuitry of ring oscillator circuit 324 to measure the oscillator frequency.

By using the combination of the change in oscillator frequency and the Vt-shift measured at Sense OUT, the system enables complete characterization of the NBTI of a P-transistor 321.

Figure 10:
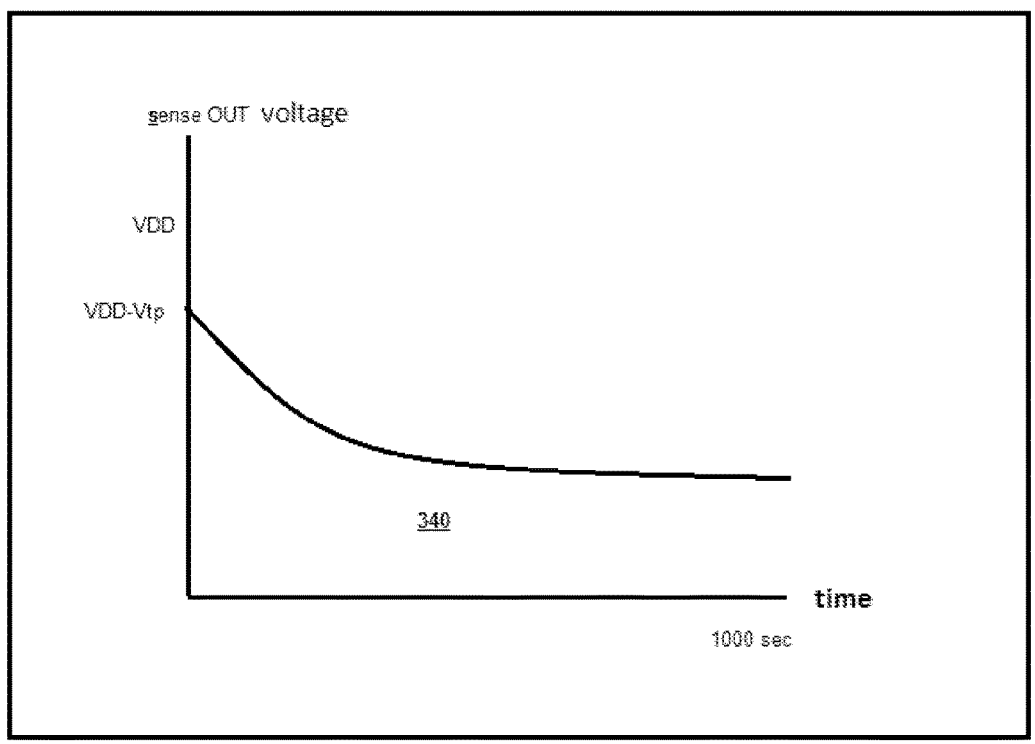
FIG. 10 is an exemplary output of the drain voltage of the stressed P device of the source follower configuration of FIG. 8 as a function of stress time.

Referring now to FIG. 10, a representation of one embodiment of a sensor node Sense OUT voltage over time 340 of a stressed device under evaluation is shown. Sense OUT voltage over time 340 represents the net degradation in Vtp of a P-transistor under stress during evaluation.

Figure 11:
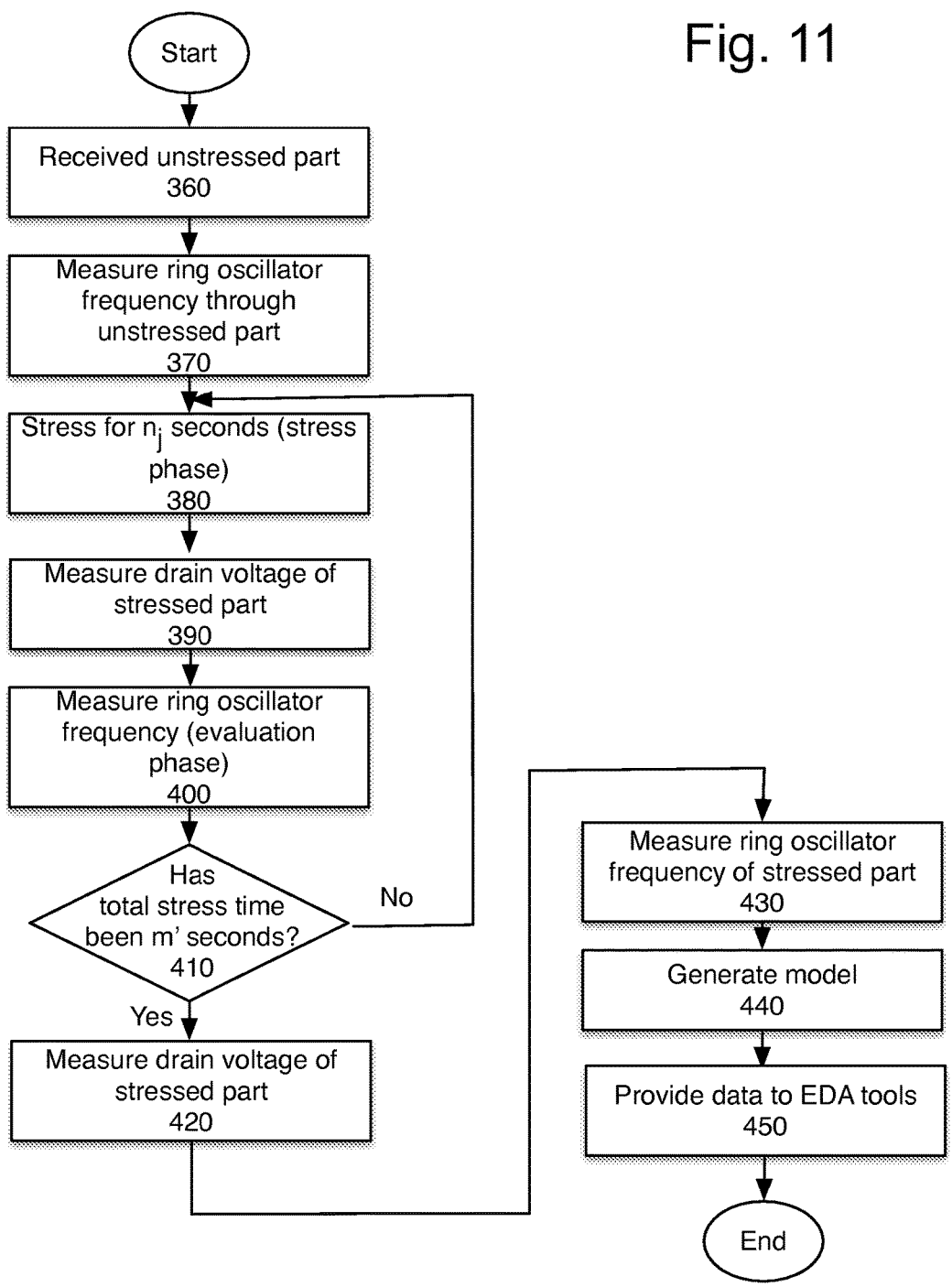
FIG. 11 is a flowchart of the testing cycle of the embodiment presented in FIG. 8.

Referring now to FIG. 11, a flowchart of one embodiment of a stress testing procedure is shown. In accordance with this flow, a procedure is initiated with a fresh unstressed P-transistor (block 360). With the fresh P-transistor in normal operating mode, representative of an evaluate phase, a ring oscillator output is measured and recorded (block 370). Then the P-transistor is subjected to stress for a first specified number of seconds ($n_j$) with the gate of the P-transistor at Vgate representing a stress phase of a stress and evaluation cycle (block 380).

After the first specified number of seconds (n), the stress inputs are released. An evaluate phase of a stress and evaluation cycle is entered where the output of the drain voltage of the P-transistor device under stress is measured (block 390) and the frequency of the ring oscillator is measured and recorded (block 400). If the cumulative number of seconds from the cycles of block 380 is less than the desired cumulative total (m'), then another stress cycle of a stress and evaluation cycle is entered lasting for a second specified number of seconds (at block 380). The length of the various cycles of the stress test need not be similar in length. In one embodiment, the cumulative number of seconds from the cycles of block 380 totals a desired cumulative total stress time of 1000 seconds. In another embodiment, the cumulative number of seconds from the cycles of block 380 totals a desired cumulative total stress time of 500 seconds. If the cumulative number of seconds from the cycles of block 380 is greater than or equal to the desired cumulative total in block 410, then a final evaluation cycle for a final measurement and recording of the post-stress device drain voltage (block 420) and frequency of the ring oscillator (block 430).

One of skill in the art would understand that FIG. 11 illustrates only one embodiment of a stress/evaluate flow for NBTI evaluation of a P-transistor herein the degradation of the P-transistor threshold voltage and the total degradation of the P-transistor are each separately quantified. For example, Steps 360 through 430 can be repeated for any desirable duration of first and second numbers of seconds with intermediate measurements of post stress device drain voltage and frequencies of the ring oscillator.

The effects of the stress test are used to generate a model (block 440). The model characterizes the effect of NBTI on the P-transistors. This is then made available to Electronic Design Automation (EDA) tools (block 450), which can use the model in design.

Figure 12:
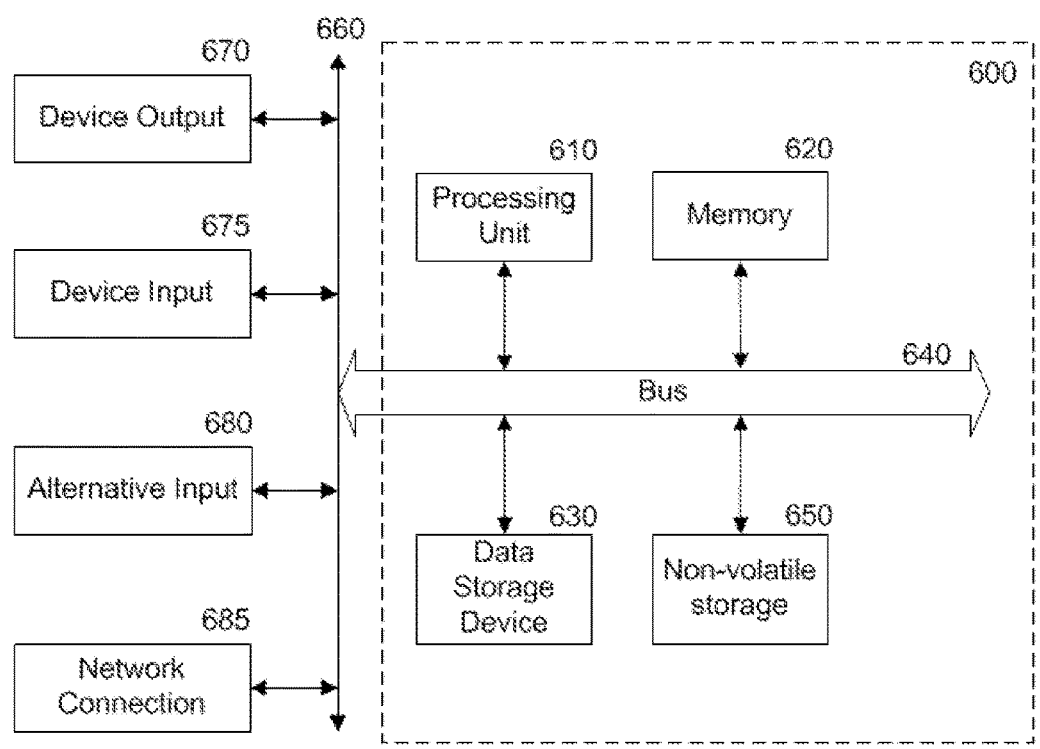
FIG. 12 is a block diagram of one embodiment of a computer system that may be used with the present invention.

FIG. 12 is a block diagram of a particular machine that may be used with the present invention. It will be apparent to those of ordinary skill in the art, however that other alternative systems of various system architectures may also be used.

The data processing system illustrated in FIG. 12 includes a bus or other internal communication means 640 for communicating information, and a processing unit 610 coupled to the bus 640 for processing information. The processing unit 610 may be a central processing unit (CPU), a digital signal processor (DSP), or another type of processing unit 610.

The system further includes, in one embodiment, a random access memory (RAM) or other volatile storage device memory 620 (referred to as memory), coupled to bus 640 for storing information and instructions to be executed by processing unit 610. Main memory 620 may also be used for storing temporary variables or other intermediate information during execution of instructions by processing unit 610.

The system also comprises in one embodiment a read only memory (ROM) 650 and/or static storage device 650 coupled to bus 640 for storing static information and instructions for processing unit 610. In one embodiment, the system also includes a data storage device 630 such as a magnetic disk or optical disk and its corresponding disk drive, or Flash memory or other storage which is capable of storing data when no power is supplied to the system. Data storage device 630 in one embodiment is coupled to bus 640 for storing information and instructions.

The system may further be coupled to an output device 670, such as a cathode ray tube (CRT) or a liquid crystal display (LCD) coupled to bus 640 through bus 660 for outputting information. The output device 670 may be a visual output device, an audio output device, and/or tactile output device (e.g. vibrations, etc.)

An input device 675 may be coupled to the bus 660. The input device 675 may be an alphanumeric input device, such as a keyboard including alphanumeric and other keys, for enabling a user to communicate information and command selections to processing unit 610. An additional user input device 680 may further be included. One such user input device 680 is cursor control device 680, such as a mouse, a trackball, stylus, cursor direction keys, or touch screen, may be coupled to bus 640 through bus 660 for communicating direction information and command selections to processing unit 610, and for controlling movement on display device 670.

Another device, which may optionally be coupled to computer system 600, is a network device 685 for accessing other nodes of a distributed system via a network. The communication device 685 may include any of a number of commercially available networking peripheral devices such as those used for coupling to an Ethernet, token ring, Internet, or wide area network, personal area network, wireless network or other method of accessing other devices. The communication device 685 may further be a null-modem connection, or any other mechanism that provides connectivity between the computer system 600 and the outside world.

Note that any or all of the components of this system illustrated in FIG. 9 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 620, mass storage device 630, or other storage medium locally or remotely accessible to processing unit 610.

It will be apparent to those of ordinary skill in the art that the system, method, and process described herein can be implemented as software stored in main memory 620 or read only memory 650 and executed by processing unit 610. This control logic or software may also be resident on an article of manufacture comprising a computer readable medium having computer readable program code embodied therein and being readable by the mass storage device 630 and for causing the processing unit 610 to operate in accordance with the methods and teachings herein.

The present invention may also be embodied in a handheld or portable device containing a subset of the computer hardware components described above. For example, the handheld device may be configured to contain only the bus 640, the processing unit 610, and memories 650 and/or 620.

The handheld device may be configured to include a set of buttons or input signaling components with which a user may select from a set of available options. These could be considered input device #1 675 or input device #2 680. The handheld device may also be configured to include an output device 670 such as a liquid crystal display (LCD) or display element matri6 for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 610, a data storage device 630, a bus 640, and memory 620, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 685.

It will be appreciated by those of ordinary skill in the art that any configuration of the particular machine implemented as the computer system may be used according to the particular implementation. The control logic or software implementing the present invention can be stored on any machine-readable medium locally or remotely accessible to processing unit 610. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A circuit comprising:
   a transistor for testing, the transistor having a gate to source voltage Vgs and a drain to source voltage Vds;
   a sensor circuit coupled to the drain or the source of the transistor;
   a complementary control circuitry coupled to the transistor and the sensor circuit, the complementary control circuit powering off the sensor circuit and setting Vds to zero during a stress phase of a stress test of the transistor, the complementary control circuit powering the sensor circuit through the transistor during an evaluate phase of the stress test; and
   a Sense OUT node, providing a measurement of a threshold voltage of the transistor, wherein a threshold voltage degradation and a saturation current degradation calculated based on the threshold voltage reading at the Sense OUT node and an output of the sensor circuit is used to completely characterize an BTI effect on the transistor.

2. The circuit of claim 1, wherein the sensor circuit is a ring oscillator.

3. The circuit of claim 1, where a test signal is coupled to the gate of the transistor.

4. The circuit of claim 1, the complementary control circuitry comprising:
   a pair of transistors coupled to the sensor circuit to set a voltage across the sensor circuit to zero and ensure the Vds is zero during the stress phase of the stress test.

5. The circuit of claim 1, the complimentary control circuit coupled to the transistor to set the source and/or drain of the transistor for a bias voltage for Vds during the stress test, to evaluate an effect of a combination of Negative Bias Thermal Instability (NBTI) and Hot Carrier Injection (HCI) degradation.

6. The circuit of claim 1, wherein the stress phase of the stress test comprises setting the Vgs in an "on" state at a negative voltage compared to Vds.

7. The circuit of claim 1, further comprising:
a current limiter connecting the gate and the drain of the transistor to block feedback to the gate of the transistor during the stress test.

8. The circuit of claim 7, wherein the current limiter is a resistor having a large resistance value.

9. The circuit of claim 7, wherein the resistance value of the resistor is selected to prevent clamping of a voltage of the gate to a ground during stress testing.

10. The circuit of claim 1, wherein the Sense OUT node and the output of the sensor circuit characterize a threshold voltage degradation and a saturation current degradation of the transistor.

11. A method of stress testing a transistor comprising:
stressing the transistor during a stress phase, where a drain to source voltage Vds of the transistor is zero, a gate of the transistor is at a negative voltage with respect to the Vds, and an on-chip sensor is not powered;
evaluating an effect of the stressing on the transistor, during the evaluating the transistor operates normally and characteristics of the transistor are sensed through the on-chip sensor; and
calculating a threshold voltage degradation and a saturation current degradation based on a threshold voltage reading at a Sense OUT node and an output of the sensor circuit, to completely characterize an BTI effect on the transistor.

12. The method of claim 11, wherein the sensor is a ring oscillator.

13. The method of claim 11, wherein the sensor is coupled to a drain or a source of the transistor.

14. The method of claim 11, further comprising:
utilizing a current limiter between a gate and the drain of the transistor to prevent clamping of the gate of the transistor during stress testing.

15. The method of claim 14, wherein the current limiter is a resistor having a large resistance value selected to allow the gate to be pulled to any desired negative value without clamping.

16. The method of claim 15, wherein the large resistance value of the resistor is selected to prevent clamping of a voltage of the gate to a ground during stress testing.

17. The method of claim 11, further comprising:
utilizing a current limiter between the drain of the transistor and an N-type transistor of a complementary control circuitry coupled to the on-chip sensor.

18. The method of claim 17, wherein the current limiter is a resistor having a large resistance value selected to prevent clamping of a voltage of the gate to a ground during stress testing.

19. The method of claim 11, further comprising:
wherein a complimentary control circuit is coupled to the transistor to set the source and/or drain of the transistor for a bias voltage for Vds during the stress test, to evaluate an effect of a combination of Negative Bias Thermal Instability (NBTI) and Hot Carrier Injection (HCI) degradation.

20. The method of claim 11, further comprising:
creating a model of the transistor based on the threshold voltage degradation and the saturation current degradation; and
providing the model to an electronic design automation (EDA) tool, used in designing circuits including the transistor.

21. A system to characterize an impact of thermal instability on a transistor, comprising:
a sensor circuit powered off during a stress phase of a stress test of the transistor, where a drain to source voltage Vds of the transistor is zero, a gate of the transistor is at a negative voltage with respect to the Vds, and an on-chip sensor is not powered, and the sensor circuit powered through the transistor during an evaluate phase of the stress test;
a memory to store output of the sensor circuit as a characterization of the transistor;
a processor to calculate a threshold voltage degradation and a saturation current degradation based on a threshold voltage reading and an output of the sensor circuit, to completely characterize an BTI effect on the transistor, and to create a model of the transistor based on a threshold voltage degradation and a saturation current degradation; and
an electronic design automation (EDA) tool to utilize the model of the transistor in designing circuits.

22. The system of claim 21, wherein the
wherein a complimentary control circuit is coupled to the transistor to set a source and/or drain of the transistor for a bias voltage for Vds during the stress test, to evaluate an effect of a combination of Negative Bias Thermal Instability (NBTI) and Hot Carrier Injection (HCI) degradation.

23. The system of claim 21, wherein the characterization of the transistor is a length of the stress phase versus the amount of degradation of the transistor.

24. The system of claim 21, wherein a test-setup includes a complementary control circuitry comprising a pair of transistors coupled to the sensor circuit to set a voltage across the sensor circuit to zero and ensure the Vds is zero during a stress phase of the stress test.

* * * * *